(12) United States Patent
Hill et al.

(10) Patent No.: US 7,274,468 B2
(45) Date of Patent: Sep. 25, 2007

(54) OPTICAL BEAM SHEARING APPARATUS

(75) Inventors: Henry Allen Hill, Tucson, AZ (US); Justin L. Kreuzer, Trumbull, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 11/132,800

(22) Filed: May 19, 2005

(65) Prior Publication Data

US 2005/0213105 A1    Sep. 29, 2005

Related U.S. Application Data

(62) Division of application No. 10/271,034, filed on Oct. 15, 2002, now Pat. No. 6,917,432.

(51) Int. Cl.
*G01B 9/02* (2006.01)
(52) U.S. Cl. .................... 356/520; 356/498; 356/493

(58) Field of Classification Search ............... 356/520, 356/508, 510, 498, 500, 493, 491, 492
See application file for complete search history.

(56) References Cited

U.S. PATENT DOCUMENTS 5,157,459 A * 10/1992 Oono et al. ................. 356/520
5,430,548 A * 7/1995 Hiroi et al. ................. 356/394
6,806,961 B2 * 10/2004 Hill ............................ 356/487

* cited by examiner

*Primary Examiner*—Hwa (Andrew) Lee
(74) *Attorney, Agent, or Firm*—Francis J. Caufield

(57) ABSTRACT

Beam shearing apparatus for introducing a lateral shear between the components of a light beam. The apparatus is an optical assembly having a polarizing interface and input and output facets and two reflecting surfaces one of which is arranged at an angle generally opposite the input facet and the other of which is arranged at an angle generally opposite the output facet.

9 Claims, 14 Drawing Sheets

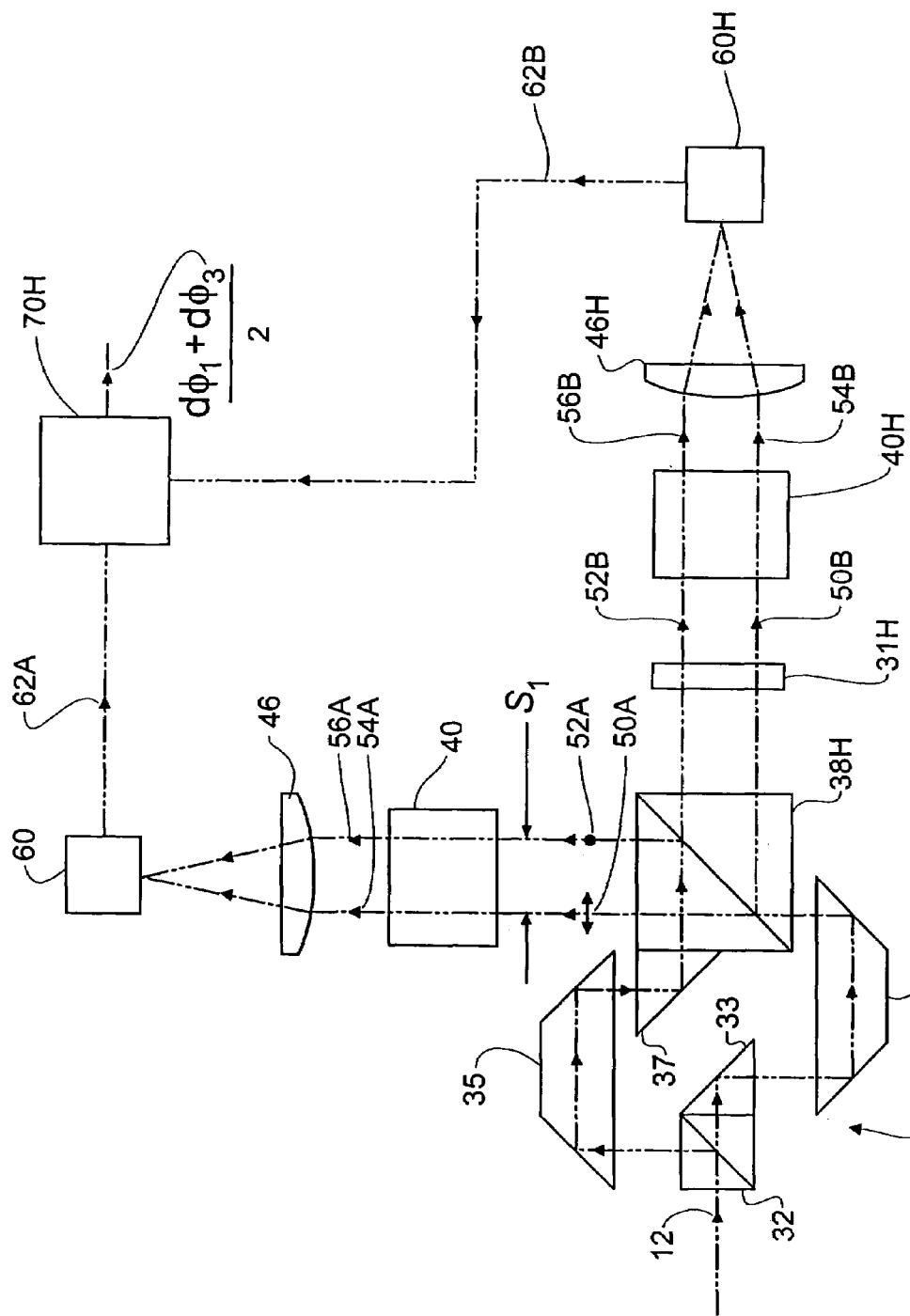

OPTICAL BEAM SHEARING APPARATUS

CROSS REFERENCE TO RELATED APPLICATIONS

This application is a divisional of U.S. patent application Ser. No. 10/271,034 entitled INTERFEROMETERS FOR MEASURING CHANGES IN OPTICAL BEAM DIRECTION filed on Oct. 15, 2002 now U.S. Pat. No. 6,917,432 in the name of Henry Allen Hill, et al., the entire contents of which are incorporated herein by reference.

BACKGROUND OF THE INVENTION

This invention generally relates to interferometry and more particularly to interferometric apparatus and methods by which highly precise metrology is practiced.

In highly precise metrology, it is required to understand and compensate for changes in the direction of propagation of various individual optical beams in which information is encoded about distances and/or angles under measurement. Changes in the direction of propagation of such beams or in their angular relationships with respect to one another, or some reference, are often introduced by pitch, yaw, and roll of various optical components in the interferometer as, for example, those that might be experienced by a quickly stewing planar measurement mirror in a plane mirror interferometer, or the like. If such effects are not compensated, it is often not possible to achieve the desired precision required of important industrial applications such as those practiced in the fabrication of semiconductor devices.

In addition, where interferometers have dynamic elements that may be used to control the direction of propagating beams, some means for measuring errors in beam direction and a measurement of a change in an angle of an object is needed to provide feedback signals for controlling such elements.

Consequently, it is a primary object of the present invention to provide apparatus and methods for measuring the direction of propagation among one or more optical beams.

It is another object of this invention to provide apparatus and methods by which changes in the direction of propagation and/or angular relationships among one or more optical beams may be measured with interferometric precision.

Other objects of the invention will in part appear hereinafter and will in part be obvious when reading the following detailed description in connection with the accompanying drawings.

SUMMARY OF THE INVENTION

The invention is an interferometric apparatus and method for measuring and monitoring changes in direction of propagation of an optical beam or components of an optical beam in either a plane or in two orthogonal planes. The optical beam may comprise two components that have the same or different directions of propagation, are orthogonally polarized, and that may have the same frequencies or different frequencies.

Eight embodiments and variants thereof of the present invention are described herein. The eight embodiments and variants thereof differ with respect to whether angle measurements are being made in one plane or in two orthogonal planes, with respect to whether angle measurements are being made of the average direction of propagation of a two component optical beam or being made of the difference in direction of propagation of components of a two component optical beam, and with respect to the frequencies of a multiple component beam.

The inventive apparatus in one set of embodiments and variants thereof comprises at least one beam-shearing assembly for introducing a lateral shear between components of the optical beam. This is followed by an analyzer for selecting polarization components of the optical beam that have a common polarization state. Afterwards, a lens focuses the commonly polarized beam components to spots in a detector plane. A detector located in detector plane is provided for receiving the focused spots and generating an electrical interference signal having a phase that varies in accordance with the angular change in one or both components of the optical beam in at least one plane. Electronic means receive the electrical interference signal, determine the phase therefrom, and convert the phase to the angular change in the average direction of propagation of the optical beam components. The optical beam components preferably comprise orthogonally polarized beams having a frequency difference between them so that the electrical signal is a heterodyne signal.

The inventive apparatus in a second set of embodiments and variants thereof comprises at least one beam-shearing assembly for introducing a lateral shear between components of the optical beam. The beam-shearing assembly further introduces an image inversion to one of the components. This is followed by an analyzer for selecting polarization components of the optical beam that have a common polarization state. Afterwards, a lens focuses the commonly polarized beam components to spots in a detector plane. A detector located in detector plane is provided for receiving the focused spots and generating an electrical interference signal having a phase that varies in accordance with the angular change in one or both components of the optical beam in at least one plane. Electronic means receive the electrical interference signal, determines the phase therefrom, and converts the phase to the change between the directions of propagation of the components of the optical beam hereinafter referred to as the differential angular change. The optical beam components preferably comprise orthogonally polarized beams having a frequency difference between them so that the electrical signal is a heterodyne signal.

BRIEF DESCRIPTION OF THE DRAWINGS

The structure, operation, and methodology of the invention, together with other objects and advantages thereof, may best be understood by reading the detailed description in connection with the drawings in which each part has an assigned number that identifies it wherever it appears in the various drawings and wherein:

FIG. 1e is a diagrammatic elevational view of a first variant of the first embodiment of the invention that makes angle measurements in one plane wherein the input beam comprises a single optical frequency;

DESCRIPTION OF INVENTION

The invention is an interferometric apparatus and method for measuring and monitoring changes in the average direction of propagation of a single or two component optical beam or the differential changes in directions of propagation of a two component optical beam in either a plane or in two orthogonal planes. The two components may have the same or different directions of propagation, are orthogonally polarized, and may have the same frequencies or different frequencies.

Four embodiments and variants thereof of the present invention are described herein. The four embodiments and variants thereof differ with respect to whether angle measurements are being made in one plane or in two orthogonal planes, with respect to whether angle measurements are being made of the direction of propagation of a single component optical beam or of the average direction of propagation of a two component optical beam or being made of the difference in direction of propagation of a two component optical beam, and with respect to the frequencies of a multiple component beam.

Figure 1A:
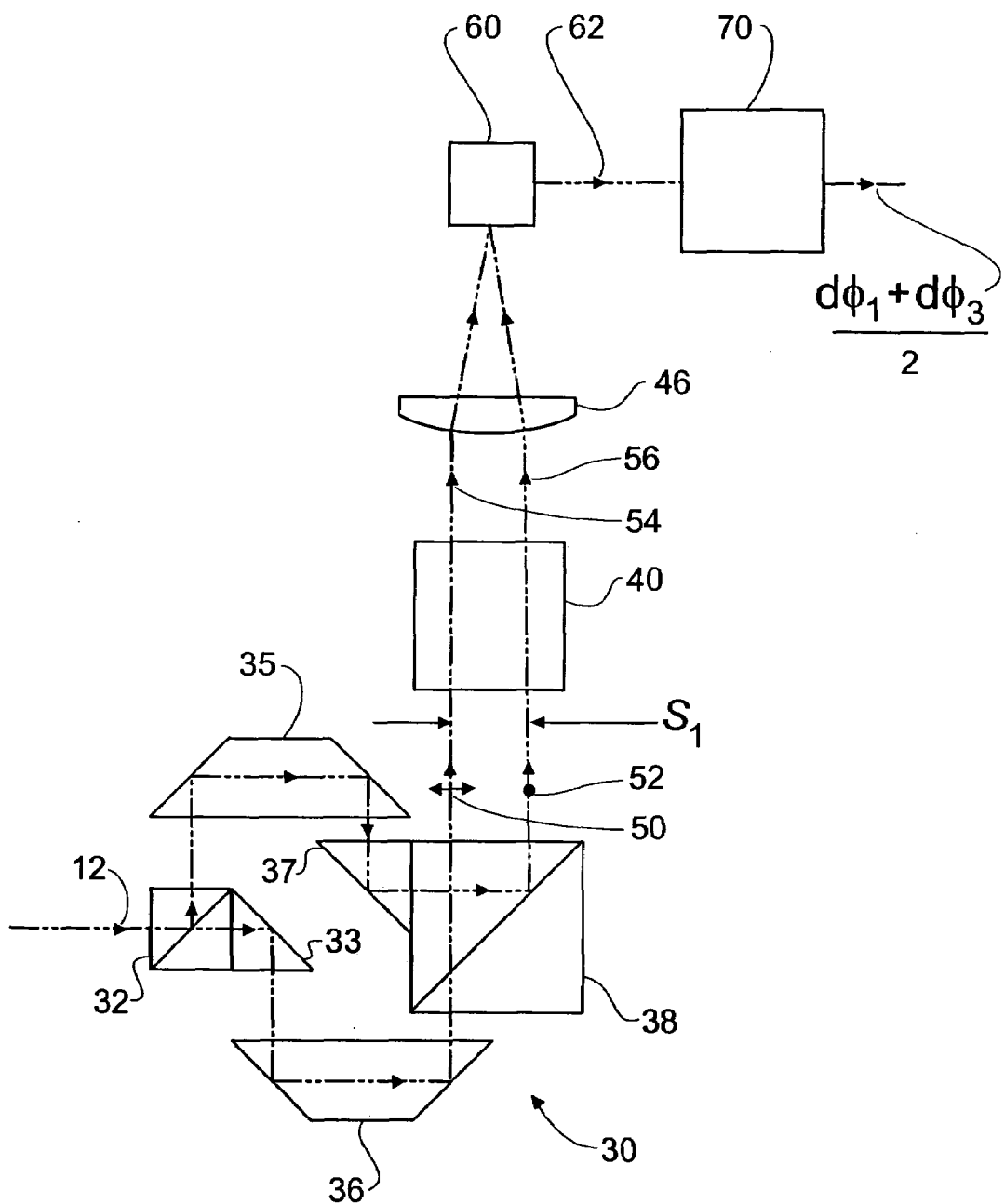
FIG. 1a is a diagrammatic elevational view of a first embodiment of the invention that makes angle measurements in one plane with the use of a single detector arrangement.

The first embodiment of the present invention is shown schematically in FIG. 1a and makes angle measurements in one plane of the average direction of propagation of an optical beam comprising two components. The first embodiment comprises beam-shearing assembly generally shown at element numeral 30, analyzer 40, lens 46, detector 60, and electronic processor 70. Input beam 12 comprises two orthogonally polarized optical beam components having a difference in frequencies of $f_1$. The planes of polarization of the two orthogonally polarized components are parallel and orthogonal to the plane of FIG. 1a, respectively.

Beam-shearing assembly 30 introduces a lateral shear $S_1$ between the two orthogonally polarized beams 50 and 52, respectively (see FIG. 1a). A portion of each of the spatially sheared output beams 50 and 52 are transmitted by analyzer 40 as components 54 and 56, respectively. Analyzer 40 is orientated so that beam components 54 and 56 are both polarized in a common plane orientated at 45 degrees to the plane of FIG. 1a.

Next, beam components 54 and 56 are incident on lens 46 wherein lens 46 focuses beam components 54 and 56 to spots on detector 60 to be detected preferably by a quantum photon detector to generate electrical interference signal 62 or heterodyne signal $s_1$. The spots substantially overlap. Heterodyne signal $s_1$ is transmitted to electronic processor 70 for determination of the heterodyne phase of signal $s_1$ and a corresponding average direction of propagation of beam 12 in the plane of FIG. 1a.

Beam-shearing assembly 30 comprises polarizing beamsplitters 32 and 38, right angle prisms 33 and 37, and truncated Porro prisms 35 and 36. The component of beam 12 polarized in the plane of FIG. 1a is transmitted by polarizing beamsplitter 32, reflected by right angle prism 33, redirected by truncated Porro prism 36, and transmitted by polarizing beamsplitter 38 as beam 50. The component of beam 12 polarized orthogonal to the plane of FIG. 1a is reflected by polarizing beamsplitter 32, redirected by truncated Porro prism 35, reflected by right angle prism 37, and reflected by polarizing beamsplitter 38 as beam 52.

Note that the optical path in glass for each of beams 54 and 56 through beam-shearing assembly 30 and analyzer 40 are preferably the same. This feature of the apparatus design of the first embodiment produces a high stability interferometer system with respect to changes in temperature.

Heterodyne signal $s_1$ may be written as $$s_1 = A_1 \cos(\omega_1 t + \Phi_1 + \zeta_1) \tag{1}$$

where $$\phi_1 = 2k_1 n [d_1 \cos\theta'_1 + d_2 \cos\theta'_2 - d_3 \cos\theta'_3 - d_4 \cos\theta'_4], \tag{2}$$

Figure 1B:
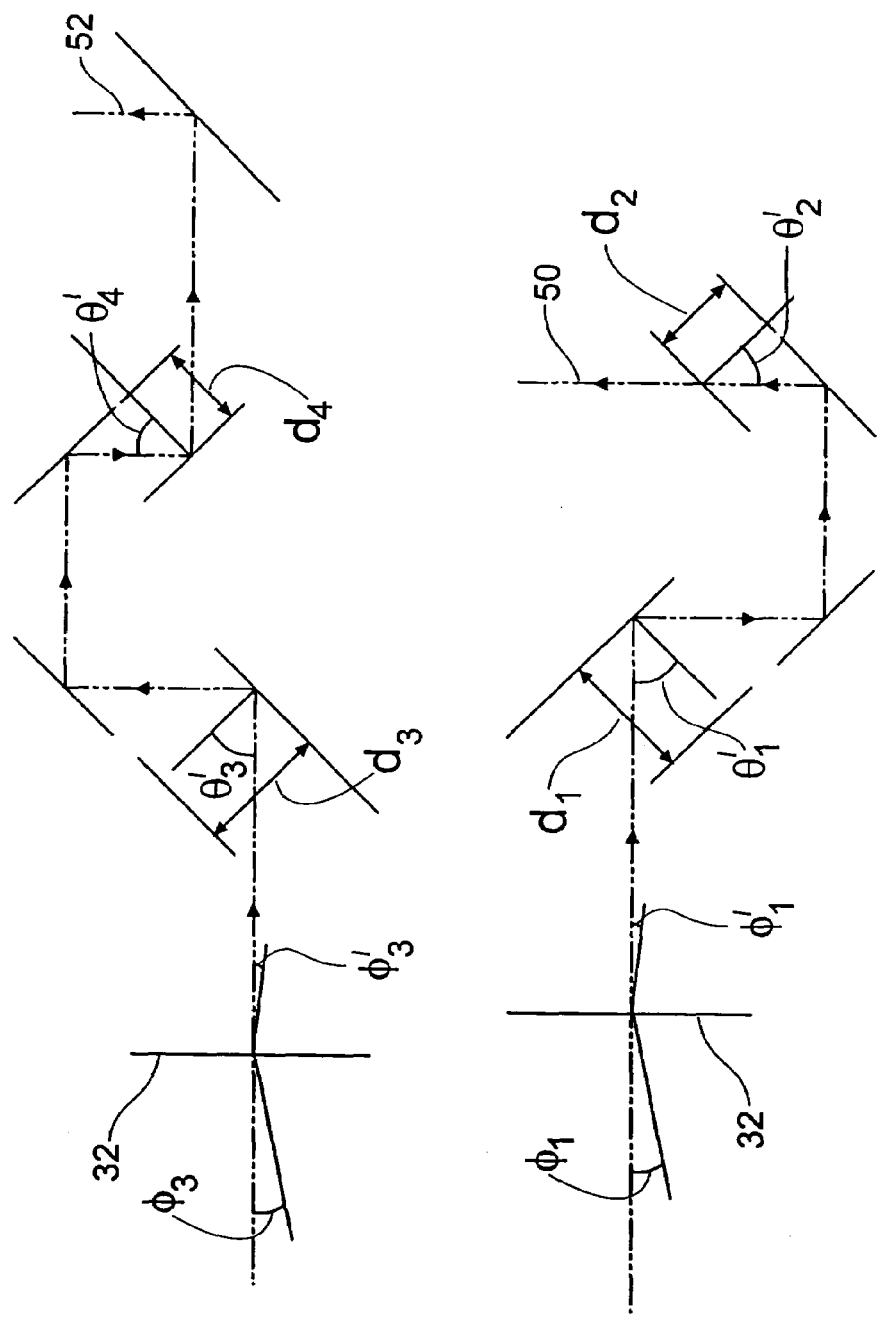
FIG. 1b is a diagrammatic elevational illustration showing the relationship between various angles and distances of the embodiment of the invention shown in FIG. 1a and is useful in understanding its operation.

$\omega_1 = 2\pi f_1$, $\zeta_1$ is an offset phase not associated with phase $\phi_1$, $k_1 = 2\pi/\lambda_1$, $\lambda_1$ is the wave length of input beam 12, $\theta'_1$ and $\theta'_2$ are angles of incidence of beam 50 at right angle prism 33 and at the polarizing beamsplitter 38, respectively, (see FIG. 1b), $\theta'_3$ and $\theta'_4$ are angles of incidence of beam 52 at polarizing beamsplitter 32 and at right angle prism 37, respectively, (see FIG. 1b), and $d_1, d_2, d_3,$ and $d_4$ are defined in FIG. 1b. It has been assumed in Eq. (2) for purposes of demonstrating the features of the present invention in a simple fashion, without departing from the scope and spirit of the present invention, that all of the optical paths in beam-shearing assembly 30 have the same index of refraction. For a non-limiting example of $d_1 = d_3$, $d_2 = d_4$, $\theta'_1 + \theta'_2 = \pi/$ 2, and $\theta'_3+\theta'_4=\pi/2$, Eq. (2) reduces to the simpler expression for $\phi_1$, $$\varphi_1 = 2^{1/2}k_1n\begin{bmatrix}(d_1-d_2)[\cos(\theta'_1+\pi/4)+\cos(\theta'_4+\pi/4)] + \\ (d_1+d_2)[\sin(\theta'_1+\pi/4)-\sin(\theta'_4+\pi/4)]\end{bmatrix} \quad (3)$$

Lateral shear $S_1$ is related to properties of beam-shearing assembly 30 according to the equation $$S_1 = 2\begin{bmatrix}(d_1\sin\theta'_1-d_2\sin\theta'_2)\sec\phi'_1\cos\phi_1 + \\ (d_3\sin\theta'_3-d_4\sin\theta'_4)\sec\phi'_3\cos\phi_3\end{bmatrix} \quad (4)$$

where $\phi_1$ and $\phi'_1$ are the angles of incidence and refraction of beam 50 at entrance facet of polarizing beamsplitter 32 and $\phi_3$ and $\phi'_3$ are the angles of incidence and refraction of beam 52 at entrance facet of polarizing beamsplitter 32 (see FIG. 1b). For the non-limiting example, $$S_1 = 2^{1/2}\left\{(d_1-d_2)\begin{bmatrix}\sin(\theta'_1+\pi/2)\sec\phi'_1\cos\phi_1 + \\ \sin(\theta'_4+\pi/2)\sec\phi'_3\cos\phi_3\end{bmatrix} + (d_1+d_2)\begin{bmatrix}\sin(\theta'_1-\pi/2)\sec\phi'_1\cos\phi_1 - \\ \sin(\theta'_4+\pi/2)\sec\phi'_3\cos\phi_3\end{bmatrix}\right\} \quad (5)$$

The expression given for $S_1$ by Eqs. (4) and (5) represent the primary mechanism used for generation of the beam shear. However, there are other mechanisms for introducing a beam shear such as associated with angle of incidence dependent phase shifts (Goos-Wänchen effect).

Figure 1C:
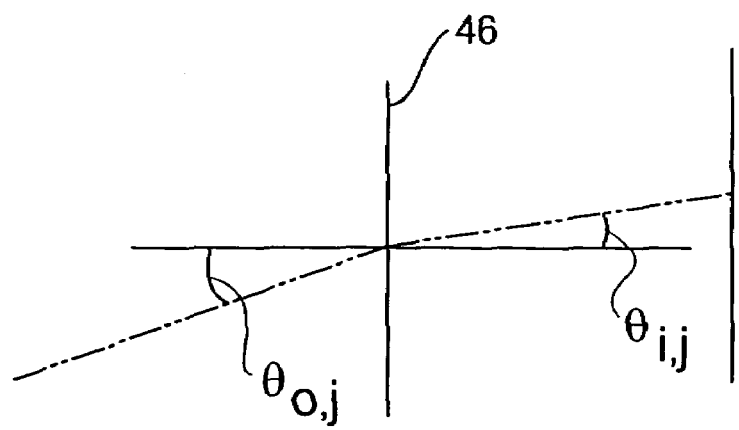
FIG. 1c is a diagrammatic representation that is useful in defining certain relationships employed in practicing the invention.
Figure 1D:
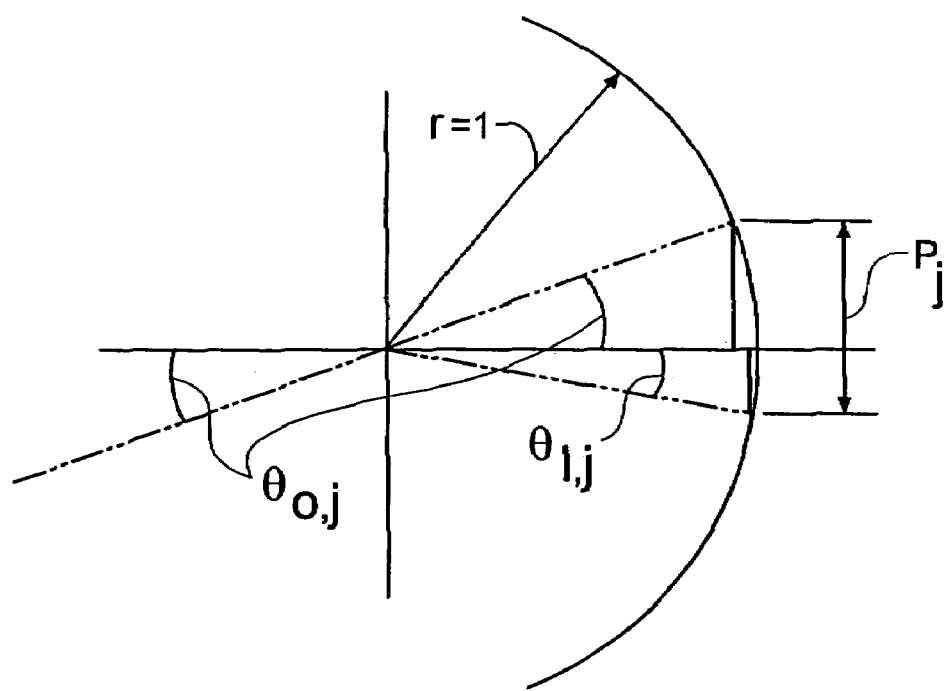
FIG. 1d is another diagrammatic representation that is useful in defining certain relationships employed in practicing the invention.

Amplitude $A_1$ is proportional to a good approximation to a Fourier component of the Fourier transform of $|h(p_1)|^2$, i.e., $$A_1 \propto \int |h(p_1)|^2 \cos[4k_1p_1S_1]dp_1 \quad (6)$$

where $h(p_1)$ is the Fourier transform of the amplitude of one of the beams 54 or 56 at lens 46 multiplied by the pupil function of lens 46, $$p_j = \sin\theta_{o,j}+\sin\theta_{i,j}, j=1,2\ldots, \quad (7)$$

and the definition of $\theta_{o,j}$ and $\theta_{o,j}$ are shown in FIG. 1c. Angles $\theta_{o,j}$ and $\theta_{i,j}$ are conjugate angles of principle rays of beam j in the object and image space of lens 46. The definition of $p_j$ is shown in FIG. 1d.

It is evident from Eqs. (2) and (3) that the resolution of phase $\phi_1$ in terms of a change in a direction of an optical beam is increased as the length $2^{3/2}(d_1-d_2)$ is increased. However, the usable range for $2^{3/2}(d_1-d_2)$ is defined by the spatial frequency bandwidth of the Fourier transform of $|h(p_1)|^2$ as shown by Eq. (6).

The optimum value for $2^{3/2}(d_1-d_2)$ is generally equal to approximately one half a characteristic spatial dimension of a beam transmitted by a respective pupil. Consider, for example, the case of a rectangle pupil of dimension b in the plane of FIG. 1a for both beam 54 and beam 56 at lens 46 and the amplitudes of beams 54 and 56 being uniform across respective pupils. For this case, $|h(p_1)|^2$ is a sinc function squared; i.e. $(\sin x/x)^2$, and the Fourier transform of $|h(p_1)|^2$ is a triangle function $\Lambda$. Triangle function $\Lambda$ has a maximum value of 1 for $2^{3/2}(d_1-d_2)=0$ and has a value of 0 for $2^{3/2}(d_1-d_2)\geq b$. Therefore, amplitude $A_1=0$ for $2^{3/2}(d_1-d_2) \geq b$ and the resolution of phase $\phi_1$ in terms of a change in a direction of an optical beam is 0 for $2^{3/2}(d_1-d_2)=0$. Thus, the optimum value for $2^{3/2}(d_1-d_2)$ is in this case approximately b/2. The actual optimum value for $2^{3/2}(d_1-d_2)$ will depend on the criterion used to define an optimum operating condition with respect to a signal-to-noise ratio, for example. For the case where the components of beam 12 have Gaussian intensity profiles, the optimum value for $2^{3/2}(d_1-d_2)$ will be approximately w, where w is the radius at which the intensity of beam 12 has a value equal to 1/e of the intensity at beam 12 at its center.

For an example of a beam having a Gaussian intensity profile with 2w=5.0 mm, $\theta_1$=45 degrees, and $\lambda_1$=633 nm, the sensitivity of the phase $\phi_1$ to changes in $d\phi_1$ and $d\phi_3$ expressed in differential form is given by the equation $$d\varphi_1 = k_1w\left[\frac{d\phi_1+d\phi_3}{2}\right] \quad (8)$$
$$= -2.5\times 10^4\left[\frac{d\phi_1+d\phi_3}{2}\right].$$

Note as evident from Eq. (8) that the sensitivity of the change in phase $\phi_1$ with respect to changes in angles $d\phi_1$ and $d\phi_3$ is independent of the index of refraction n. This is an important property of the first embodiment. In particular, the sensitivity of the change in phase of $\phi_1$ with respect to changes in angles $d\phi_1$ and $d\phi_3$ has a sensitivity to temperature changes that is independent in first order to thermal induced changes in the refractive index of the optical elements of beam-shearing assembly 30 and only dependent on thermal coefficients of expansion of the optical elements of beam-shearing assembly 30. The thermal coefficients of the elements of beam-shearing assembly 30 can be selected to be less than $\leq 0.5$ ppm/degC. For similar reasons, the zero value of $\phi_1$ also exhibits a corresponding low sensitivity to changes in temperature of beam-shearing assembly 30.

The two primary quantities that place restrictions on the range of average value $[d\phi_1+d\phi_3]/2$ that can be accommodated by the first embodiment are the magnitude of the difference $[d\phi_1-d\phi_3]/2$ and the size of the sensitive area of detector 60. The amplitude of the heterodyne signal will be reduced by a factor of approximately 2 when $$wk_1\left[\frac{[d\phi_1-d\phi_3]}{2}\right] \approx 1.$$

The higher terms in $d\phi_1$ and $d\phi_3$ that are omitted in Eq. (8) can be easily determined from Eq. (2) if required for a particular end use application.

There are two alternate embodiments for the preceding beam-shearing assembly 30. These two alternate embodiments are shown schematically in FIGS. 1h and 1i at 30' and 30", respectively. They are described in detail below along with the results of an error budget analyses.

Figure 1F:
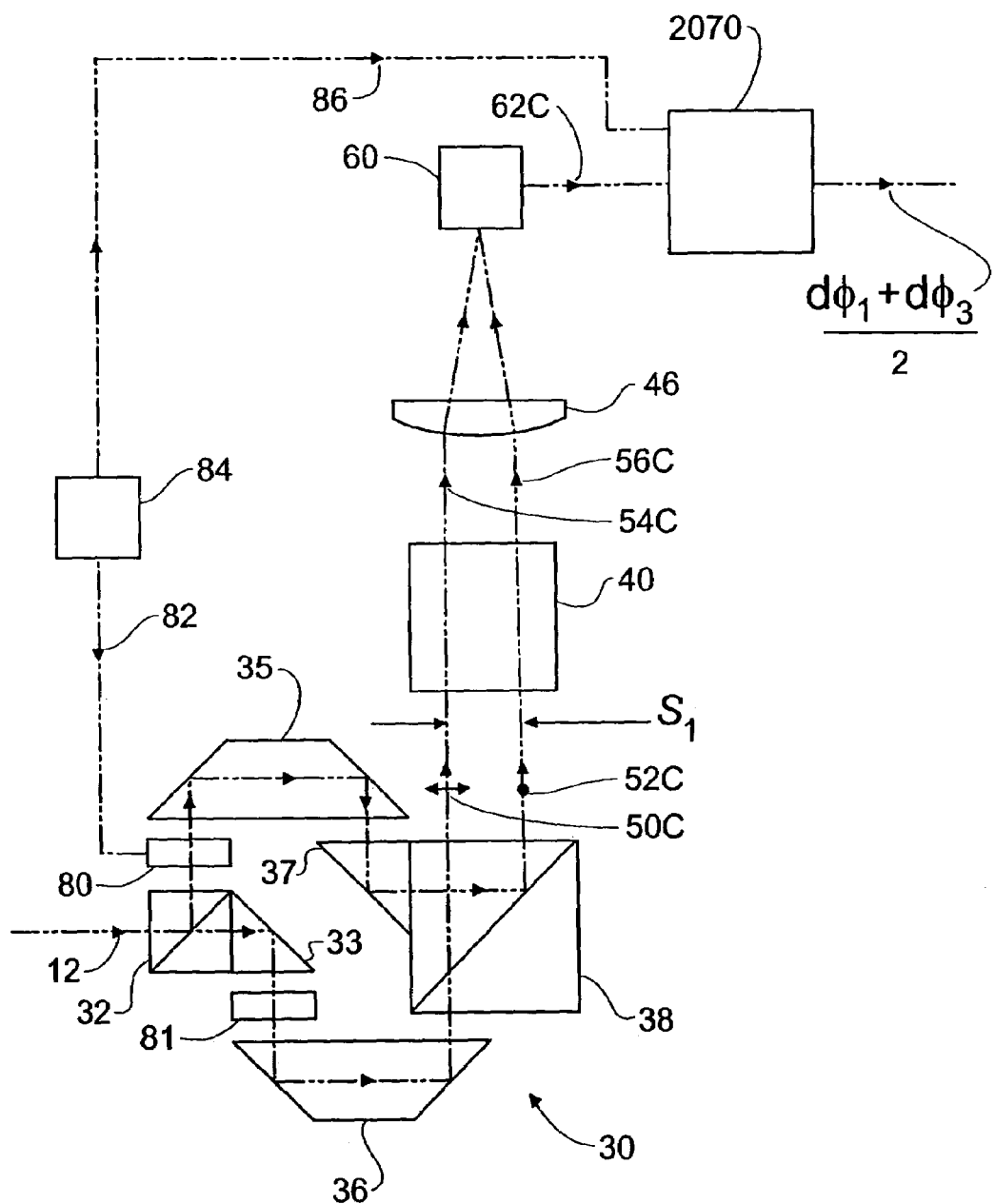
FIG. 1f is a diagrammatic elevational view of a second variant of the first embodiment of the invention that makes angle measurements in one plane wherein the input beam comprises a single optical frequency.
Figure 1G:
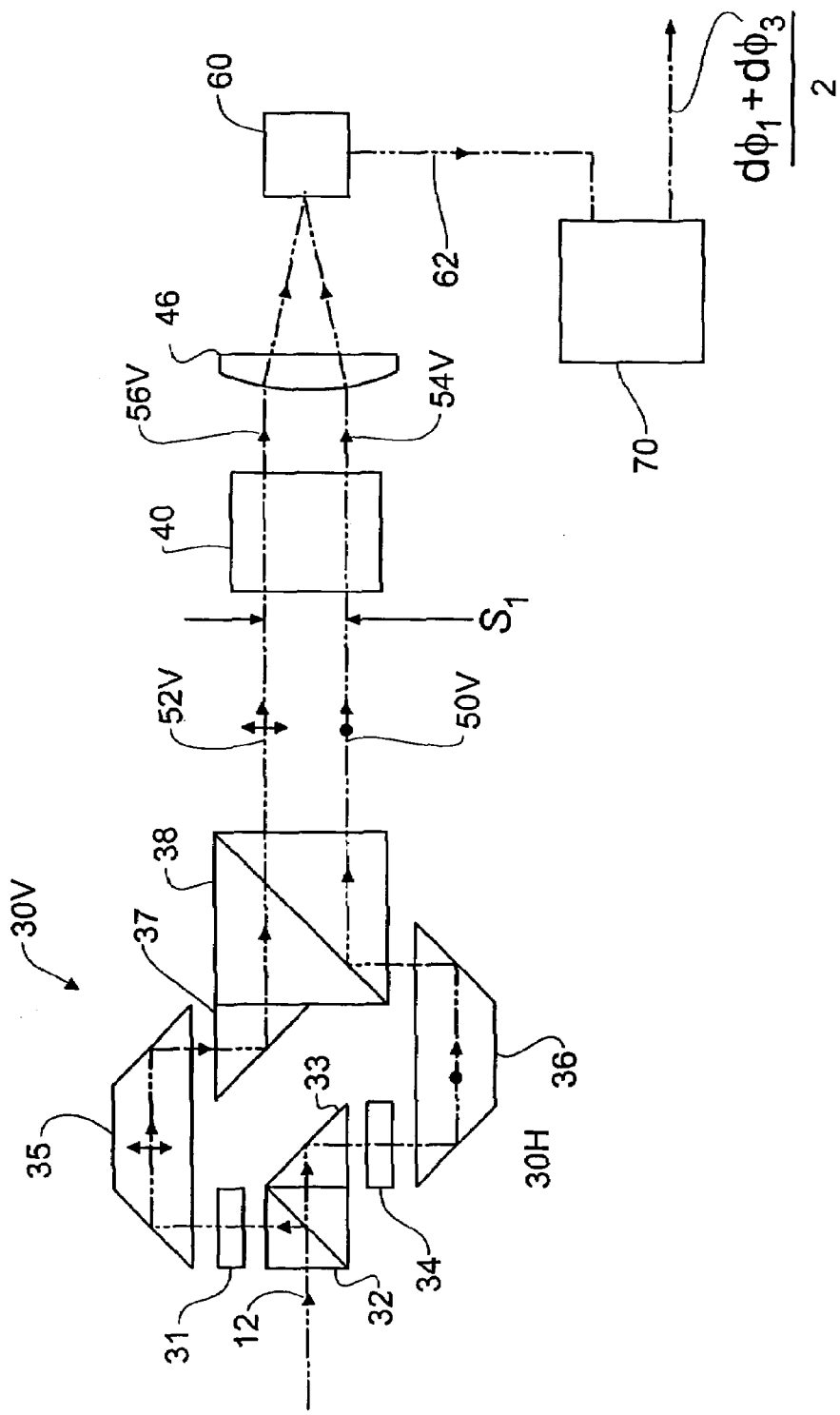
FIG. 1g is a diagrammatic elevational view of a third variant of the first embodiment of the invention that makes angle measurements in one plane wherein the input beam comprises a single optical frequency.
Figure 1H:
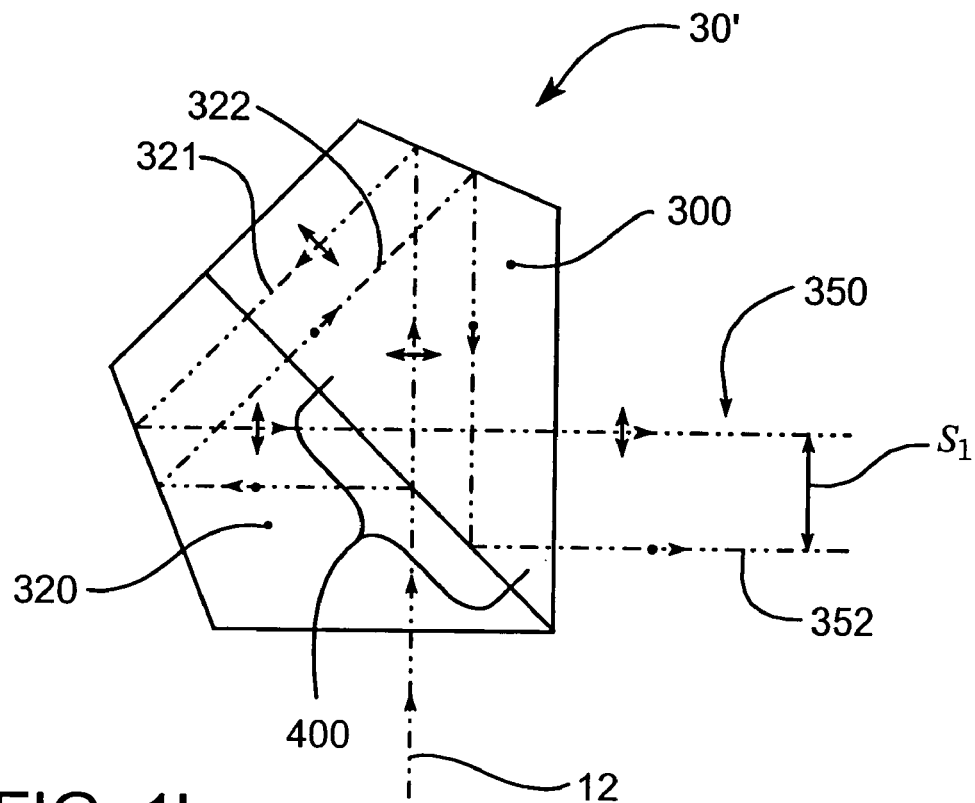
FIG. 1h is a diagrammatic elevational view of a second embodiment of beam-shearing assembly 30.

The beam-shearing assembly shown in FIG. 1h at numeral 30' comprises two trapezium prisms 300 and 320 and a polarizing interface 400. The beam-shearing assembly shown schematically in FIG. 1i at numeral 30" comprises a polarizing beamsplitter cube 346 with polarizing interface 340 and two mirrors 342 and 344. The description of the operation of each of the two beam-shearing assemblies is functionally the same.

Assembly 30' introduces beam shear $S_1$ between the output beam components 350 and 352, and assembly 30"

introduces beam shear $S_2$ between output beam components 450 and 452. Assembly 30' introduces a relative phase shift $\phi_1$ between the output beam components 350 and 352 and assembly 30" introduces phase shift $\phi_2$ between output beam components 450 and 452.

Phase shift $\phi_j$ may be written as $$\phi_j = S_j k\theta \quad (9)$$

for j=1 and 2 where wavenumber $k=2\pi/\lambda$, $\lambda$ is the wavelength of the input beam 12, and $\theta$ is the change in angular direction of input beam 12 with respect to a null position. There are second and higher order terms that have been omitted in Equation (9) which generally become important for conditions involving larger angles and temperature changes than contemplated for lithography applications. At the null position, $$\phi_j = 0. \quad (10)$$

Figure 1I:
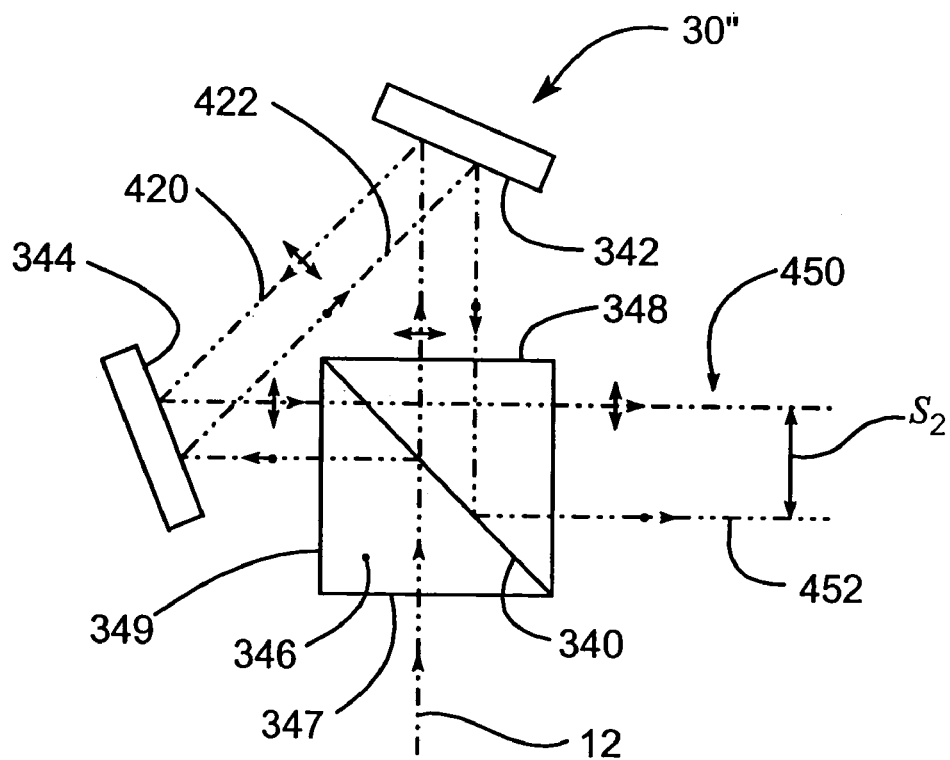
FIG. 1i is a diagrammatic elevational view of a third embodiment of beam-shearing assembly 30.

The null positions for the two different beam-shearing assembly configurations correspond to directions of input beam 12 wherein the angles between beams 321 and 322 and beams 420 and 422 are each $\pi$ in the planes of FIGS. 1h and 1i, respectively.

Temperature Sensitivity Analysis

The existence of the null position as expressed by Equation (10) is a primary basis for a high stability of the beam-shearing assembles with respect to temperature changes. The temperature sensitivity of $\phi_1$ is expressed as $$\begin{aligned} \frac{d\varphi_1}{dT} &= \alpha_1(kS_1\theta) + \frac{1}{2}\left[\alpha_1 + \frac{1}{n_1}\left(\frac{dn_1}{dT}\right)\right](n_1kS_1)\beta_1 - \\ &\quad \left[\frac{1}{n_1}\left(\frac{dn_1}{dT}\right)\right](kS_1)\gamma_1 \\ &= kS_1\left\{\alpha_1\theta + \frac{1}{2}\left[\alpha_1 + \frac{1}{n_1}\left(\frac{dn_1}{dT}\right)\right]n_1\beta_1 - \\ &\quad \left[\frac{1}{n_1}\left(\frac{dn_1}{dT}\right)\right](kS_1)\gamma_1\right\} \end{aligned} \quad (11)$$

where T is temperature, $\alpha_1$ is the thermal coefficient for expansion for prisms 300 and 320, $n_1$ is the refractive index for prisms 300 and 320, $\beta_1$ is the compliment of the angle between the directions of beams 321 and 322 in the plane of FIG. 1h at $\theta=0$, and $\gamma_1$ is the angle of incidence of beam 12 at prism 320 in the plane of FIG. 1h at $\theta=0$. The corresponding temperature sensitivity of $\phi_2$ is given by the formula $$\begin{aligned} \frac{d\varphi_2}{dT} &= \alpha_2(kS_2\theta) + \frac{1}{2}\alpha_2(kS_2)\beta_2 + \frac{1}{2}\left(\frac{dn_2}{dT}\right)(kS_2)(\delta_{2,1} + \delta_{2,2}) \\ &= kS_2\left\{\alpha_2\theta + \frac{1}{2}\alpha_2\beta_2 + \frac{1}{2}\left(\frac{dn_2}{dT}\right)(\delta_{2,1} + \delta_{2,2})\right\} \end{aligned} \quad (12)$$

where $\alpha_2$ is the thermal coefficient for expansion of the spacer that determines the spatial separation of mirrors 342 and 344, $n_2$ is the refractive index of polarizing beamsplitter 346, $\beta_2$ is the compliment of the angle between the directions of beams 420 and 422 in the plane of FIG. 1h at $\theta=0$, $\delta_{2,1}$ is the angle in the plane of FIG. 1i between facets 347 and 348 of polarizing beamsplitter 346, and $\delta_{2,2}$ is the departure from $\pi/2$ in the plane of FIG. 1i of the angle between facets 347 and 349.

Note that the affects of the temperature dependence of the refractive indices of prisms 300 and 320 and polarizing beamsplitter cube 346 enter into the temperature sensitivities of $\phi_1$ and $\phi_2$ through second order terms, i.e., as a product of a first order term in a change in temperature $\Delta T$ and a first order term in the form of a small angle, e.g., $\beta_1$ or $\beta_2$.

The absence of a first order sensitivity of the temperature sensitivity $d\phi_j/dT$ on an index of refraction reduces the selection of the composition of prisms 300 and 320 and the composition of the spacer determining the spatial separation of mirrors 342 and 344 to a consideration of only thermal expansion coefficients. For example, fused silica is strongly favored over BK7.

It is evident from Eq. (11) that the thermal expansion coefficients $\alpha_1$ and $\alpha_2$ affect only the scale factors between changes in $\phi_1$ and $\phi_2$ and changes in $\theta$ and do not affect the respective phases at the null value of $\theta$. This makes the beam-shearing assembly a very robust system. For assembly 30' with prisms 300 and 320 made from fused silica with $\alpha_1 = 0.5 \times 10^{-6}/C.$, the error $\epsilon_{\theta 1}$ in $\theta$ for a value of $\theta = 2 \times 10^{-3}$ rad will be $1 \times 10^{-9}$ rad per 1 degree C. change in temperature.

Assembly 30" has a further advantage in that the spacer that determines the separation of mirrors 342 and 344 may be selected without regard for optical properties, e.g., index of refraction and optical transmission. As a consequence, the spacer may be constructed from low expansion materials, e.g., Cervit and ULE, with a thermal expansion coefficient for $\alpha_2 \leq 1 \times 10^{-7}/C$. The corresponding error $\epsilon_{\theta 2}$ in $\theta$ for a value of $\theta = 1 \times 10^{-3}$ rad will be $1 \times 10^{-10}$ rad per 1 degree C. change in temperature.

The restrictions placed on $\beta_1$ and $\beta_2$ are generally not as difficult to meet as might otherwise be as a result of the noted second order temperature effects associated with $\beta_1$ and $\beta_2$. Examples of restrictions on $\beta_1$ and $\beta_2$ are listed in Tables 1 and 2, respectively, for different errors $\epsilon_{\theta 1}$ and $\epsilon_{\theta 2}$ in inferred values of $\theta_1$ and $\theta_2$, respectively. The entries in Tables 1 and 2 with $n_j = 1.47$ and $dn_j/dT = 10 \times 10^{-6}$ are for fused silica in air at $\lambda = 0.6$. The entries in Tables 1 and 2 with $n_2 = 1.52$ and $dn_2/dT = 1.4 \times 10^{-6}$ are for glass K5 in air and with $n_2 = 1.52$ and $dn_2/dT = 1 \times 10^{-7}$ are for glass K5 in vacuum at $\lambda = 0.6$ microns. The thermal expansion coefficient for K5 is $8.2 \times 10^{-6}/C$.

Effects of Temperature Gradients

The effects of temperature gradients on beam-shearing assemblies 30' and 30" are given by the formula $$d\varphi_j = \eta_j\left[(\eta_j - 1)\alpha_j + \left(\frac{dn_j}{dT}\right)\right](kS_j)\Delta T \quad (13)$$

for j=1 and 2 where $\Delta T$ is the difference in temperature across assemblies 30' and 30" for j=1 and 2, respectively, and factor $\eta_j \approx 0.7$ determined by the geometry of the respective assemblies 30' and 30". The errors in $\epsilon_{\theta j}$ for selected values of $\Delta T$ are listed in Table 3.

TABLE 1

Temperature Sensitivity Coefficients for Assembly 30'

| $\theta_1$ rad | $\alpha_1$ $10^{-6}$/C. | $n_1$ | $dn_1/dT$ $10^{-6}$/C. | $\beta_1$ rad | $\gamma_1$ rad | $\epsilon_{\theta 1}$ rad |
|---|---|---|---|---|---|---|
| $2 \times 10^{-3}$ | 0.5 | | | | | $1 \times 10^{-9}$ |
| | 0.5 | 1.47 | 10 | $\leq 1.9 \times 10^{-4}$ | | $1 \times 10^{-9}$ |
| | | 1.47 | 10 | | $\leq 1.5 \times 10^{-4}$ | $1 \times 10^{-9}$ |
| $2 \times 10^{-4}$ | 0.5 | | | | | $1 \times 10^{-10}$ |
| | 0.5 | 1.47 | 10 | $\leq 1.9 \times 10^{-5}$ | | $1 \times 10^{-10}$ |
| | | 1.47 | 10 | | $\leq 1.5 \times 10^{-5}$ | $1 \times 10^{-10}$ |

TABLE 2

Temperature Sensitivity Coefficients for Assembly 30"

| $\theta_2$ rad | $\alpha_2$ $10^{-6}$/C. | $n_2$ | $dn_2/dT$ $10^{-6}$/C. | $\beta_2$ rad | $\delta_{2,1}, \delta_{2,2}$ rad | $\epsilon_{\theta 2}$ rad |
|---|---|---|---|---|---|---|
| $2 \times 10^{-3}$ | $0.5 \times 10^{-6}$ | | | | | $1 \times 10^{-9}$ |
| | $0.5 \times 10^{-6}$ | | | $\leq 4 \times 10^{-3}$ | | $1 \times 10^{-9}$ |
| | $1 \times 10^{-7}$ | | | $\leq 2 \times 10^{-2}$ | | $1 \times 10^{-9}$ |
| | | 1.47 | 10 | | $\leq 2 \times 10^{-4}$ | $1 \times 10^{-9}$ |
| | | 1.52 | 1.4 | | $\leq 1.4 \times 10^{-3}$ | $1 \times 10^{-9}$ |
| | | 1.52 | 0.1 | | $\leq 2 \times 10^{-2}$ | $1 \times 10^{-9}$ |
| $1 \times 10^{-3}$ | $1 \times 10^{-7}$ | | | | | $1 \times 10^{-10}$ |
| | $0.5 \times 10^{-6}$ | | | $\leq 4 \times 10^{-4}$ | | $1 \times 10^{-10}$ |
| | $1 \times 10^{-7}$ | | | $\leq 2 \times 10^{-3}$ | | $1 \times 10^{-10}$ |
| | | 1.47 | 10 | | $\leq 2 \times 10^{-5}$ | $1 \times 10^{-10}$ |
| | | 1.52 | 1.4 | | $\leq 1.4 \times 10^{-4}$ | $1 \times 10^{-10}$ |
| | | 1.52 | 0.1 | | $\leq 2 \times 10^{-3}$ | $1 \times 10^{-10}$ |

TABLE 3

Temperature Gradient Sensitivity Coefficients for Assemblies 30' and 30"

| $\alpha_j$ $10^{-6}$/C. | $n_j$ | $dn_j/dT$ $10^{-6}$/C. | $\Delta T$ C. | $\epsilon_{\theta j}$ rad |
|---|---|---|---|---|
| 0.5 | 1.47 | 10 | $\approx 1.4 \times 10^{-4}$ | $1 \times 10^{-9}$ |
| 8.2 | 1.52 | 1.4 | $\approx 2.5 \times 10^{-4}$ | $1 \times 10^{-9}$ |
| 8.2 | 1.52 | 0.1 | $\approx 3.3 \times 10^{-4}$ | $1 \times 10^{-9}$ |
| 0.5 | 1.47 | 10 | $\approx 1.4 \times 10^{-5}$ | $1 \times 10^{-10}$ |
| 8.2 | 1.52 | 1.4 | $\approx 2.5 \times 10^{-5}$ | $1 \times 10^{-10}$ |
| 8.2 | 1.52 | 0.1 | $\approx 3.3 \times 10^{-5}$ | $1 \times 10^{-10}$ |

It should be noted that in beam-shearing assembly 30', a first component of input beam 12 is transmitted twice by polarization beamsplitter interface 400 and reflected by interior facets respectively, of prisms 300 and 320 to form output beam 350. A second component of input beam 12 is reflected twice by polarization beamsplitter interface 400 and reflected by interior facets of prisms 320 and 322 to form output beam 352.

Because of their far fewer optical elements, beam-shearing assembly 30' and 30", thus configured, are greatly simplified compared with beam-shearing assembly 30. This is advantageous for a number of reasons including lower cost, enhanced thermal stability, ease of assembly and calibration. In addition, there is a reduction in the potential for cyclic errors because of the reduced number of surfaces the beam components encounter. The remaining descriptions of beams 350 and 352 and 450 and 452 are the same as the corresponding portion of the descriptions given for beams 50 and 52 of the first embodiment with shear $S_1$ replaced by shear $S_3$. The description of input beam 12 in FIGS. 1h and 1i is the same as the description of input beam 12 of the first embodiment shown in FIG. 1a.

A first variant of the first embodiment of the present invention is described wherein the optical beam for which changes in direction of propagation are measured comprises a single frequency. The first variant of the first embodiment comprises the apparatus and beams of the first embodiment shown in FIG. 1e with the same element number as elements of the first embodiment performing like functions and additional components. The additional components are incorporated so as to permit homodyne detection of a phase.

The beam-shearing assembly 30H of the first variant of the first embodiment is the same as beam-shearing assembly 30 of the first embodiment. Beamsplitter 38H in the first variant of the first embodiment is a non-polarizing beamsplitter and generates beams 64B and 56B in addition to beams 64A and 56B. Description of beams 54A and 56A is the same as the description of beams 54 and 56 of the first embodiment except with respect to amplitudes. A relative phase shift is introduced between beams 54B and 56B by adjusting respective path lengths following beamsplitter 38H by phase retardation plate 31H. Beams 54B and 56B have the same state of polarization as a consequence of analyzer 40H and are focused by lens 46H to respective spots in a detector plane at detector 60H as shown schematically in FIG. 1e. Focused beams 54B and 56B are detected by detector 60H to produce electrical interference signal 62B. Electrical interference signals 62A and 62B comprise quadrature signals that are processed by electronic processor 70H for angle $[d\phi_1 + d\phi_3]/2$. The description of lens 46H, detector 60H, and electric processor 70H is the same as corresponding portions of the description given for lens 46, detector 60, and electronic processor 70 of the first embodiment.

The remaining description of the first variant of the first embodiment is the same as the corresponding portion of the description given for the first embodiment.

A second variant of the first embodiment of the present invention is shown diagrammatically in FIG. 1f wherein the optical beam for which changes in direction of propagation are measured comprises a single optical frequency. The second variant of the first embodiment comprises the apparatus and beams of the first embodiment shown in FIG. 1a with the same element number as elements of the first embodiment performing like functions and other additional components. The other additional components are incorporated so as to permit introduction of a relative phase modulation of beams 50 and 52 and detection of the phase of a resulting electrical interference signal for information about the direction of propagation of input beam 12. The phase is detected by known phase sensitive signal processing techniques.

A phase modulator 80 is introduced in beam-shearing assembly 1030 as shown schematically in FIG. 1f. Phase modulator 80 may be for example of the electro-optical type that is driven by signal 82 generated by oscillator and amplifier 84. Element 81 is introduced to maintain on the average the same optical path lengths in glass for beams 50 and 52. Oscillator and amplifier 84 also generates and transmits signal 86 to electronic processor 2070 for use as a reference signal in the phase sensitive detection of the phase of electronic interference signal 2062.

The remaining description of the second variant of the first embodiment is the same as the corresponding portion of the description given for the first embodiment.

A third variant of the first embodiment is shown schematically in FIG. 1g and makes angle measurements in one plane of the average direction of propagation of an optical beam comprising two components. The third variant of the first embodiment comprises the apparatus and beams of the first embodiment shown in FIG. 1a with the same element number as elements of the first embodiment performing like functions and other additional components. The other additional components are half-wave phase retardation plates 31 and 34 in beam-shearing assembly 30V. Phase retardation plates 31 and 34 are oriented so as to rotate the planes of polarization of beams 50V and 52V to be orthogonal and parallel to the plane of FIG. 1g, respectively. The remaining description of the third variant of the first embodiment is the same as corresponding portions of the description given for the first embodiment.

The primary difference between the third variant of the first embodiment and first embodiment is the symmetry with respect to reflections and transmissions by polarizing beamsplitters 32 and 38 for beams 50V and 52V. The symmetry eliminates in first order the sensitivity of the reflection and transmission properties of the beam-shearing assembly 30V to changes in the propagation directions of the components of beam 12.

Figure 2A:
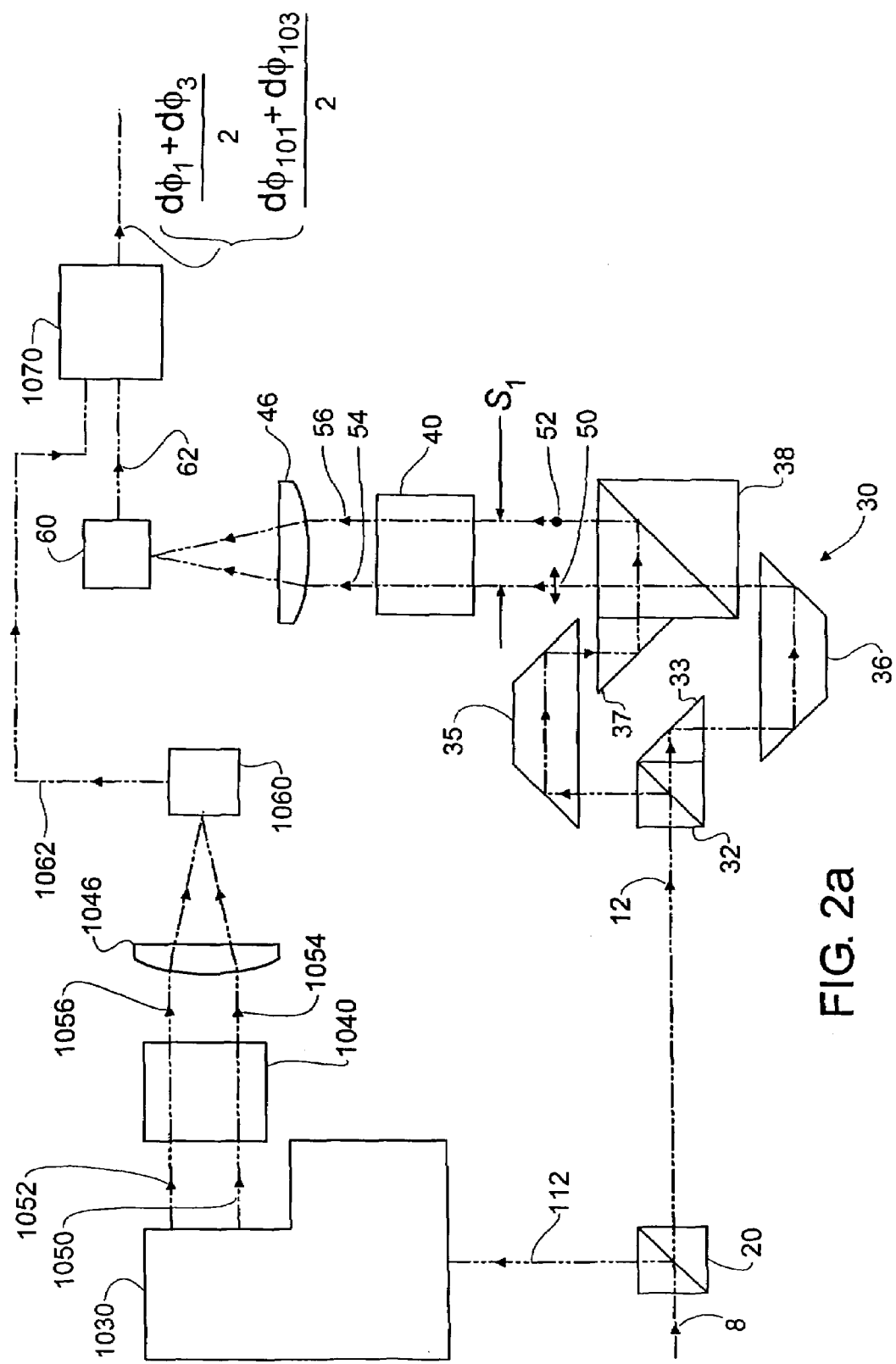
FIG. 2a is a diagrammatic elevational view of a second embodiment of the invention that makes angle measurements in two orthogonal planes.

The second embodiment of the present invention is shown schematically in FIG. 2a and makes angle measurements in two orthogonal planes. The second embodiment comprises non-polarizing beamsplitter 20 and two angle measuring interferometers. The two angle measuring interferometers measure the average direction of propagation of two components of a beam in two orthogonal planes.

Input beam 8 of the second embodiment is the same as input beam 12 of the first embodiment. A first portion of beam 8 is transmitted by non-polarizing beamsplitter 20 as beam 12. The properties of beam 12 of the second embodiment are the same as the properties of beam 12 of the first embodiment. A second portion of beam 8 is reflected by non-polarizing beamsplitter 20 as beam 112. Except for the direction of propagation, the properties of beam 112 are the same as the properties of beam 12 of the second embodiment.

The first of the two angle measuring interferometers is the same as the angle measuring interferometer of the first embodiment. The first of the two angle measuring interferometers is shown in FIG. 2a with elements having the same element number of corresponding elements of the first embodiment. The second of the two angle measuring interferometers is the same as the angle measuring interferometer the first embodiment except for orientation and is indicated as element 1030 in FIG. 2a. The angle measuring interferometer 1030 is orientated to measure the direction of propagation of components of beam 112 as angle $[d\phi_{101}+d_{103}]/2$ in a plane orthogonal to the plane of FIG. 2a wherein angles $d\phi_1$ and $d\phi_{101}$ are associated with beams 50 and 1050 and angles $d\phi_3$ and $d\phi_{103}$ are associated with beams 52 and 1052.

The plane of beam-shearing assembly 1030 and associated analyzer 1040, lens 1046, and detector 1060 are in practice in a plane that is orthogonal to the plane of beam-shearing assembly 30 and associated analyzer 40, lens 46, and detector 60. However for the purpose of simplifying the diagrammatic representation of the second embodiment without departing from the scope and spirit of the present invention, the two respective orthogonal planes are shown as lying in the plane of FIG. 2a. The remaining description of the second embodiment is the same as corresponding portions of the description given for the first embodiment.

Figure 2B:
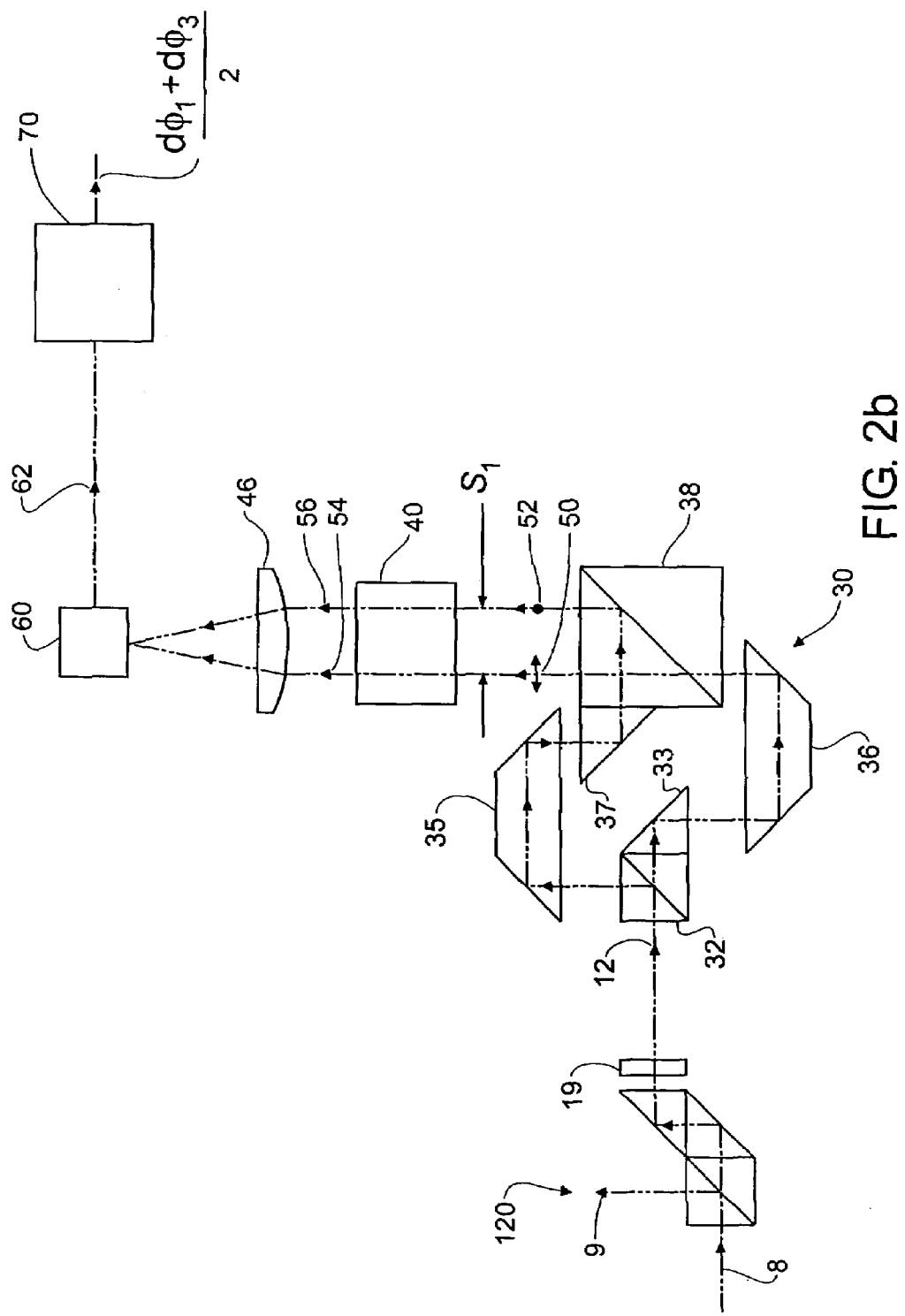
FIG. 2b is a diagrammatic elevational view of a portion of a variant of the second embodiment of the invention that makes angle measurements in two orthogonal planes.

A variant of the second embodiment is shown schematically in FIG. 2b and makes angle measurements in two orthogonal planes. The variant of the second embodiment comprises beamsplitter assembly 120 and two angle-measuring interferometers. The two angle measuring interferometers measure the direction of propagation of a beam in two orthogonal planes.

Input beam 8 of the variant of the second embodiment is the same as input beam 8 of the second embodiment. A first portion of beam 8 exits beamsplitter assembly, generally indicated at element numeral 120, as beam 12. The properties of beam 12 of the variant of the second embodiment are the same as the properties of beam 12 of the second embodiment. A second portion of beam 8 is transmitted by beamsplitter assembly 120 as image rotated beam 112. Beams 12 and 112 lie in a plane orthogonal to the planes of FIGS. 2b and 2c and parallel to the plane of FIG. 2e.

In a more detailed description of the function of beamsplitter assembly 120, input beam 8 is incident on beamsplitter assembly 120 and transmitted as beams 12 and 112. Paths of beams 12 and 112 are superimposed in FIG. 2b and shown separated in FIGS. 2d and 2e. Beamsplitter assembly 120 comprises non-polarizing beamsplitter 16, prism 118, rhomboid 18 (see FIG. 2d), and phase retardation plates 19 and 119. Rhomboid 18, shown as separated into two right angle prisms, translates the portions of components of beam 8 transmitted by non-polarizing beamsplitter 16. Rhomboid 18 does not rotate the plane of polarization of an input beam so that the polarization of beam 12 is the same as the polarization of the beam transmitted by non-polarizing beamsplitter 16. In addition, a change in direction of propagation of beam 12 resulting from a change in direction of propagation of beam 8 are equal.

However, prism 118 deviates the direction of propagation of an input beam by 90° and rotates the plane of polarization of the input beam by 90°. As a consequence, the polarization of the input beam 9 is rotated by 90° such the polarization of output beam 112 is orthogonal to the polarization of output beam 12. Also an angular displacement of the components of input beam 8 orthogonal to the plane of FIG. 2b results in an angular displacement of associated beam 112 parallel to the plane of FIG. 2b.

Beamsplitter assembly 120 also comprises phase retardation plates 19 and 119 to compensate for respective phase shifts experienced by beams 12 and 112 in transit through beamsplitter assembly 120.

Figure 2C:
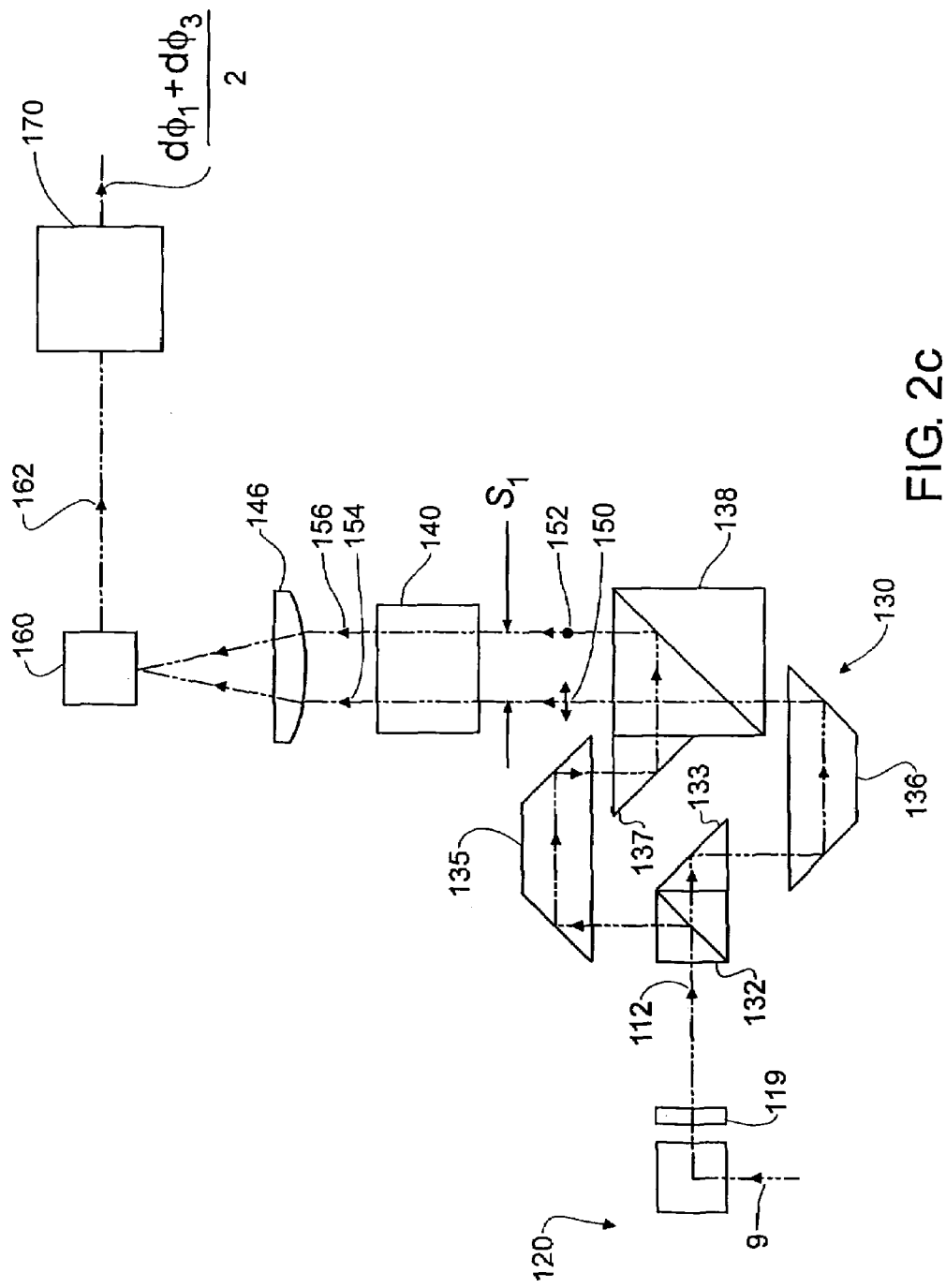
FIG. 2c is a diagrammatic elevational view of another portion of the variant of the second embodiment of the invention that makes angle measurements in two orthogonal planes.
Figure 2D:
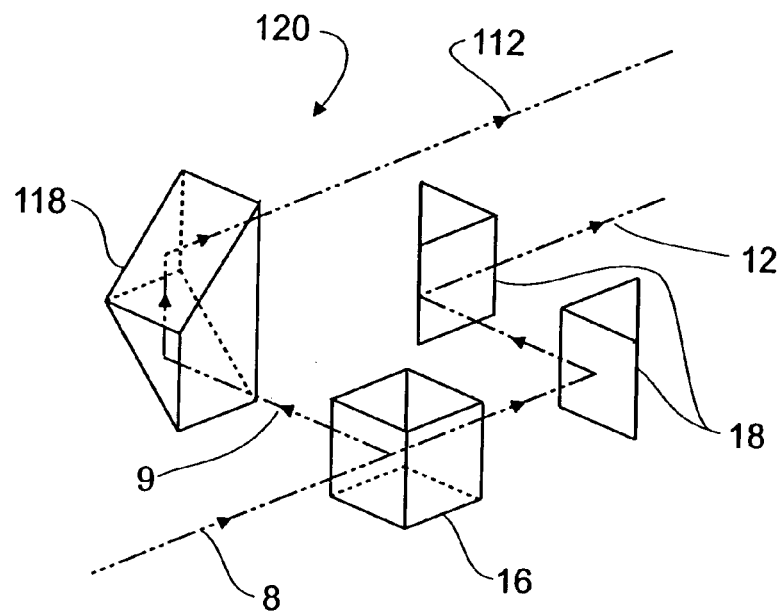
FIG. 2d is a diagrammatic perspective view of a beamsplitter assembly used in the variant of the second embodiment of the invention.
Figure 2E:
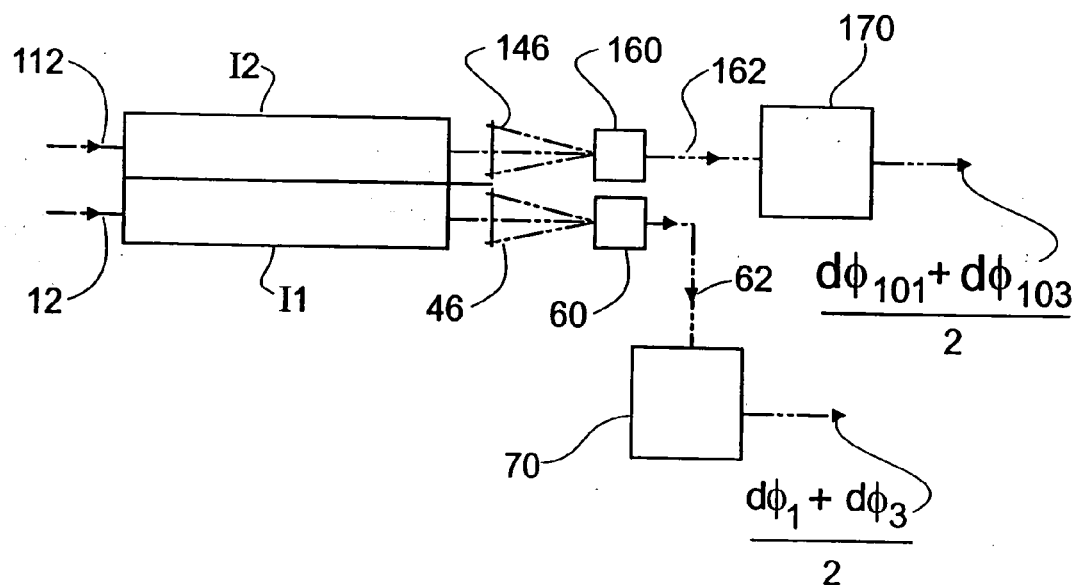
FIG. 2e is a diagrammatic elevational view of the stacking arrangement, signal detection, and processing used in the variant of the second embodiment of the invention.

The first and second angle measuring interferometers I1 and I2, respectively, are the same as the angle measuring interferometer of the first embodiment stacked one above the other (see FIG. 2e). I1 is shown in FIG. 2b with elements having the same element number of corresponding elements of the angle measuring interferometer of the first embodiment. I2 is shown in FIG. 2c with elements performing the same functions as elements of the I1. Elements of I2 have the same element numbers incremented by 100 as elements of I1 performing the same function.

Thus, as a consequence of the properties of beamsplitter assembly 120 and of stacked angle measuring interferometers I1 and I2, electronic interference signals 62 and 162 contain information about angular displacements of beam 8 parallel to the plane and orthogonal to the plane of FIG. 2b, respectively.

An advantage of the stacked configuration of the variant of the second embodiment is a compact interferometer system with reduced effects of temperature changes. Another advantage of the stacked configuration is that one common beam-shearing assembly can be used for both angle measuring interferometers. The height of elements of beam-shearing assembly 30 are increased so that beam-shearing assembly 30 serves the function of both beam-shearing assemblies 30 and 130.

The remaining description of the variant of the second embodiment is the same as corresponding portions of the description given for the second embodiment.

Other variants of the second embodiment are described wherein the second embodiment is configured for an input beam having a single frequency component. The descriptions of the other variants of the second embodiment are the same as corresponding portions of the descriptions given for the first and second variants of the first embodiment and corresponding portions of the description given for the second embodiment.

Figure 3:
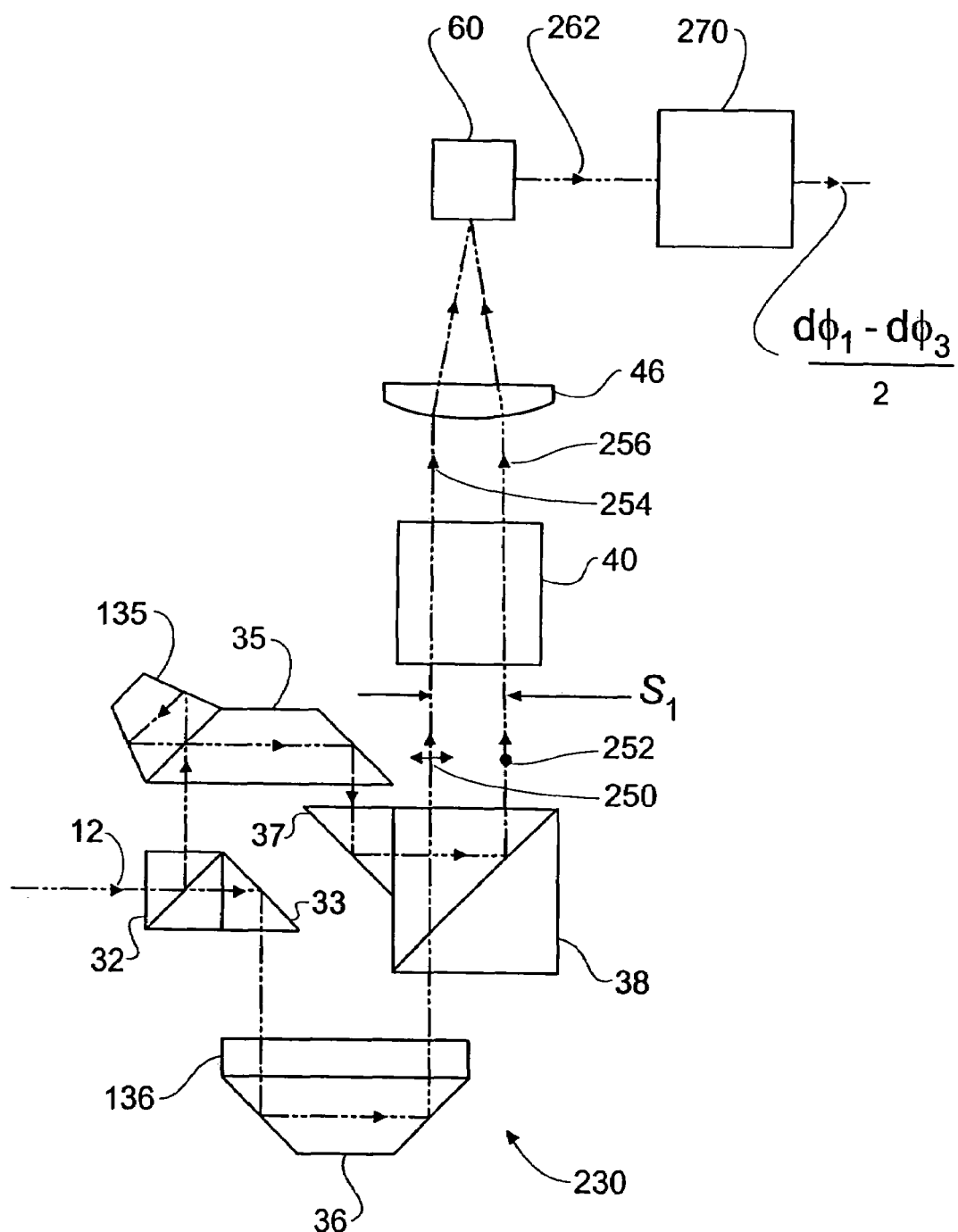
FIG. 3 is a diagrammatic elevational view of a third embodiment of the invention that makes differential angular measurements in one plane.

The third embodiment of the present invention is shown schematically in FIG. 3 and makes angle measurements in one plane of the difference in direction of propagation of components of a two component optical beam. The third embodiment comprises beam-shearing assembly generally shown at element numeral 230, analyzer 40, lens 46, detector 60, and electronic processor 70. The description of input beam 12 is the same as the corresponding portion of the description given for input beam 12 of the first embodiment.

Beam-shearing assembly 230 comprises many elements having the same the element number as elements of the beam-shearing assembly 30 of the first embodiment performing like functions. Beam-shearing assembly 230 further comprises Penta prism 135 and compensating plate 136. Penta prism 135 introduces an additional reflection in the optical path of beam 52 that, results in an image inversion of beam 52 about a normal to the plane of FIG. 3. Associated with the image inversion is a propagation direction transformation wherein a change in direction of propagation of the component of input beam 12 reflected by polarizing beamsplitter 32 is transformed into an opposite change in direction of propagation of beam 52 in the plane of FIG. 3.

The thickness of compensating plate 136 is selected such that the optical path in glass for beams 250 and 252 in beam-shearing assembly 230 are the same. The remaining description of beams 250 and 252 is the same as corresponding portions of the description given for beams 50 and 52 of the first embodiment.

The angle measured by the third embodiment is the difference in changes in directions of propagation $[d\phi_1 - d\phi_3]/2$ of the two components of input beam 12 as a result of the image inversion of beam 252 introduced by the addition of Penta prism 135.

The remaining description of the third embodiment is the same as corresponding portions of the description given for the first embodiment.

There are first and second variants of the third embodiment that correspond to the first and second variants of the first embodiment of the present invention.

A fourth embodiment of the present invention is described wherein differential angle measurements of the directions of propagation two beam components are made in two orthogonal planes. The fourth embodiment comprises non-polarizing beamsplitter 20 (FIG. 2a) and two angle measuring interferometers. The two differential angle-measuring interferometers measure the changes in the difference in directions of propagation of two components of a beam in two orthogonal planes.

The description of each of the two differential angle measuring interferometers of the fourth embodiment is the same as the corresponding description given for the differential angle interferometer of the third embodiment (FIG. 3) of the present invention. The description of the combination of the two differential angle measuring interferometers of the fourth embodiment is the same as the corresponding portion of the description given for the combination of the two angle measuring interferometers of the second embodiment of the present invention.

Variants of the fourth embodiment are described wherein the fourth embodiment is configured for an input beam having a single frequency component. The description of the other variants of the fourth embodiment is the same as corresponding portions of the descriptions given for the first and second variants of the first embodiment, corresponding portions of the description given for the second embodiment, and corresponding portions of the description given for the fourth embodiment.

The physical size of the beam-shearing assemblies of the four embodiments and variants thereof may beneficially be scaled down in size without modifying the sensitivity of the embodiments and variants thereof of the present invention by demagnifying in at least one plane the sizes of respective input beams. The demagnifying is achieved for example by adding an afocal system to the four embodiments and variants thereof that demagnify in at least one plane the size of the respective input beams. Accordingly, the size of the input beam can be magnified without modifying the sensitivity of the embodiments, and variants thereof.

The sensitivity of a measured phase difference relative to a corresponding change in an angle of a beam, e.g. Eq. (8), for one of the four embodiments and variants thereof of the present invention is not altered by the addition of an afocal system as a consequence of a general property of optical systems: the product of the size of a beam in a plane and of a change in direction of propagation of the beam in the plane is equal to product of size of a demagnified beam in the plane and of a change in direction of propagation of the demagnified beam in the plane.

Figure 4A:
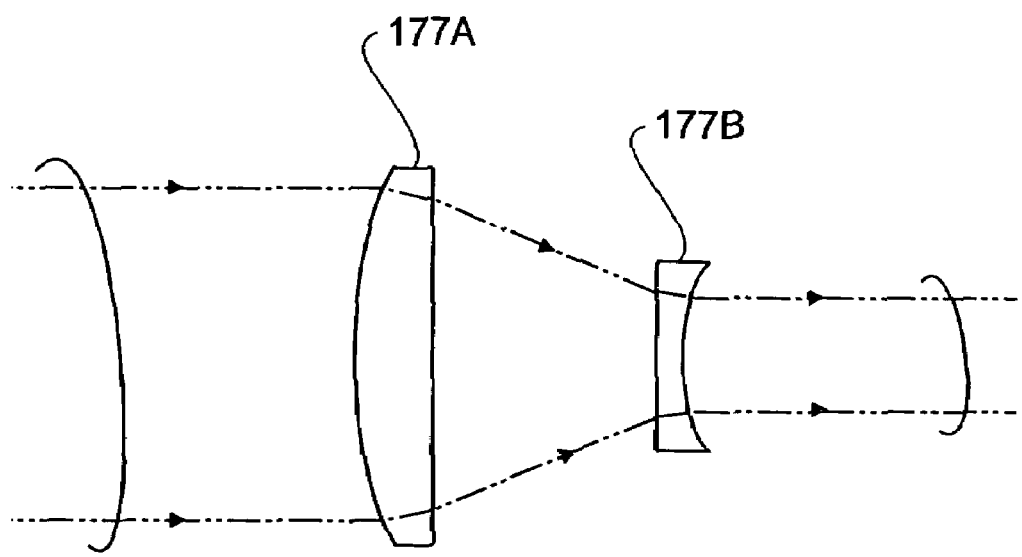
FIG. 4a is a diagrammatic elevational view of an afocal system comprising a Galilean afocal lens.

Afocal systems may comprise afocal lenses and/or anamorphic afocal attachments [see Chapter 2 entitled "Afocal Systems" by W. B. Wetherell in *Handbook Of Optics II*, Second Edition (McGraw-Hill)]. The first embodiment of an afocal system is shown diagrammatically in FIG. 4a and is known as a Galilean afocal lens. The Galilean afocal lens shown in FIG. 4a comprises positive and negative lenses 177A and 177B, respectively, and illustrates is operation in a demagnifying mode. A Keplerian afocal lens can also be used. If a Keplerian afocal lens is used, the inverting features of the. Keplerian afocal lens will change the sign of the sensitivity.

Figure 4B:
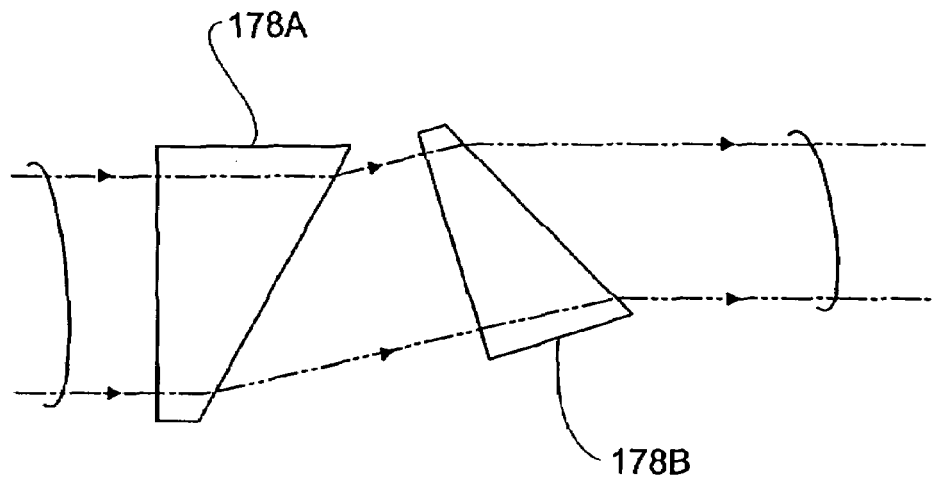
FIG. 4b is a diagrammatic elevational view of an afocal system comprising a prismatic anamorphic afocal attachment.

The anamorphic afocal attachments may be based on cylindrical lenses, prisms, and birefringent elements. Example of a prismatic anamorphic afocal attachment is shown diagrammatically in FIG. 4b. The prismatic anamorphic afocal attachment shown comprises two prisms 178A and 178B. and FIG. 4b illustrates its operation in a demagnifying mode.

Figure 4C:
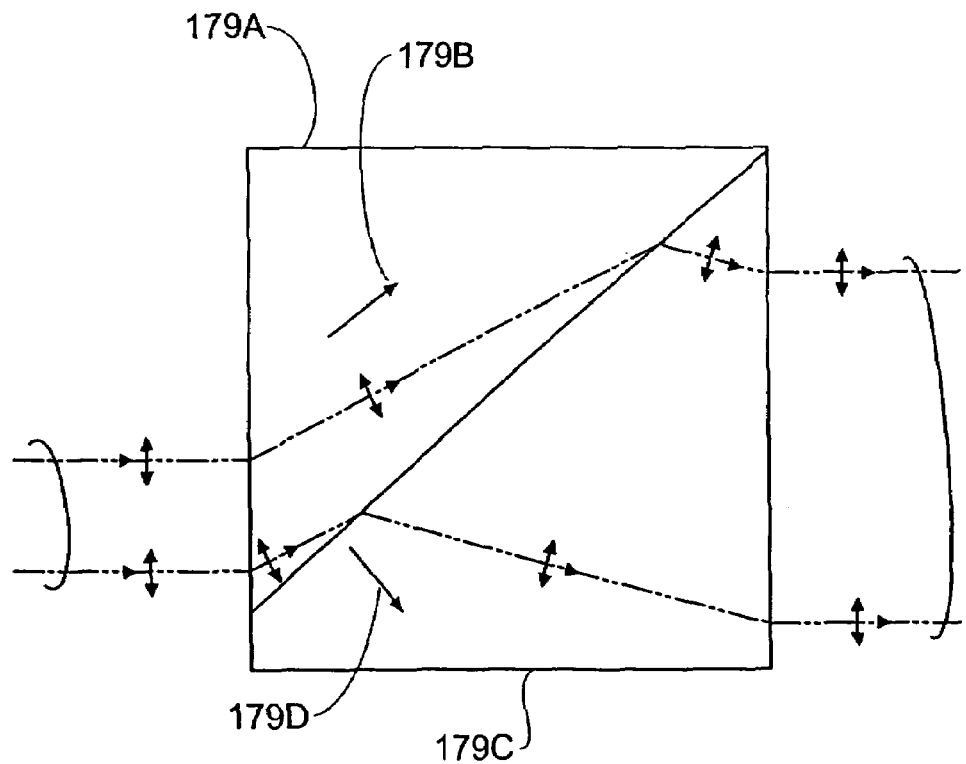
FIG. 4c is a diagrammatic elevational view of an afocal system comprising a birefringent anamorphic afocal attachment.

A birefringent anamorphic afocal attachment shown in FIG. 4c comprises two birefringent prisms 179A and 179C bonded together. FIG. 4c illustrates the operation of the birefringent anamorphic afocal attachment in a magnifying mode. The birefringent prisms may comprise for example uniaxial crystals such as calcite and paratellurite. The optic axes for birefringent prisms 179A and 179C are shown in FIG. 4c as elements 179B and 179D, respectively. Polarization of the input beam is extraordinary. The path of the input beam through the birefringent anamorphic afocal attachment and the directions for the optic axes 179B and 179D are shown for a system comprising positive uniaxial crystals wherein the ordinary index of refraction is less than the extraordinary index of refraction.

While the invention has been described with reference to particular embodiments, those skilled in the art based on the teachings of the invention will be able to make various modifications to the described embodiments without departing from the spirit and scope of the invention. For example, the invention can be practiced without relying on the polarization properties of the initial light beam. If an initial light beam does not have orthogonally polarized components, it can readily be converted to one that does through the use a suitable following polarizer or the beam shearing assembly and following signal processing can be easily modified so that their operation are not polarization dependent. In the latter case, for example, FIG. 1e can be modified by having beamsplitter 32 be nonpolarizing, removing analyzers 40 and 40H and using appropriate homodyne signal processing with one or two channels. In addition, it will be recognized that the beam shearing optical assembly can be equivalently be replaced by a birefringent crystal slab or the like, for example, calcite or lithium niobate, to introduce a phase shift between beam components. Accordingly, it is intended that all equivalent embodiments of the invention be within the scope of its claims.

What is claimed is:

1. A beam shearing apparatus for introducing a lateral shear between the components of a light beam, said apparatus comprising a polarizing beamsplitter cube having a polarizing interface and input and output facets orthogonal to one another and each of which faces said polarizing interface at an angle and two mirrors one of which is arranged to generally face opposite to and at an angle with respect to said input facet and the other of which is arranged to generally face opposite to and an angle with respect to said output facet, said polarizing interface, said input and output facets, and said two mirrors being configured and arranged with respect to one another so that the components of a light beam entering said input facet along a common path exit said output facet as separate components laterally spaced apart from one another for travel along separated paths.

2. A beam shearing apparatus for introducing a lateral shear between the components of a light beam, said apparatus consisting essentially of a pair of trapezium prisms having contiguous facets in optical contact with one another with a polarizing interface formed between them, one of said trapezium prisms having an input facet and and the other of said trapezium prisms having an output facet, said trapezium prisms each having reflecting surfaces, the reflecting surface on said trapezium prism having an output facet being arranged to generally face opposite to said input facet and at an angle with respect thereto, and the reflecting surface on the trapezium prism having an input facet being arranged to generally face opposite said output facet and at an angle with respect thereto, said polarizing interface, said input and output facets, and said two reflecting surfaces being configured and arranged with respect to one another so that the components of a light beam entering said input facet along a common path exit said output facet as separate components laterally spaced apart from one another for travel along separated paths.

3. The beam shearing apparatus of claim 2 wherein said reflecting surfaces operate by total internal reflection.

4. The beam shearing apparatus of claim 2 wherein a relative phase shift is introduced between the components of the light beam and varies in accordance with the average of the change in directions of travel of the components in at least one plane.

5. The beam shearing apparatus of claim 2 wherein said components of the light beam comprise orthogonally polarized beams.

6. The beam shearing apparatus of claim 5 wherein said components of said light beam have a frequency difference between them to enable the use of subsequently formed electrical signal heterodyne signals.

7. The apparatus of claim 2 wherein said input beam has orthogonally polarized components where each component is reflected by two surfaces of said prisms, each component making one reflection off the same surface of each prism while one component is transmitted twice and the other reflected twice by said interface.

8. The beam shearing apparatus of claim 6 wherein said beam-shearing apparatus is configured to introduce a phase change between the light beam components such that the sensitivity of the change in the phase of subsequent downstream electrical signals with respect to angular changes of said beam components has a sensitivity to temperature changes that is independent in first order to thermally induced changes in the refractive index of the optical elements of said beam-shearing apparatus and thermally induced expansion of the optical elements of said beam-shearing apparatus.

9. The apparatus of claim 2 wherein said beam-shearing apparatus is configured so that the symmetry with respect to reflections and transmissions by said polarizing interface and reflecting surfaces for said components of said light beam eliminates in first order the sensitivity of the reflection and transmission properties of said beam-shearing apparatus to changes in the propagation directions of said components of said light beam so that the relative directions of propagation of the output beam components is independent of changes in the direction of travel of the said light beam.

* * * * *